United States Patent [19]

Mimura

[11] 4,135,011

[45] Jan. 16, 1979

[54] PROCESS FOR PRODUCING MICROPOROUS SHEET MATERIALS

[75] Inventor: Masahisa Mimura, Mihara, Japan

[73] Assignee: Teijin Cordley Ltd., Osaka, Japan

[21] Appl. No.: 613,988

[22] Filed: Sep. 17, 1975

[30] Foreign Application Priority Data

Oct. 3, 1974 [JP] Japan .................. 49/113292

[51] Int. Cl.² .............................. B05D 5/00
[52] U.S. Cl. ................... 427/246; 427/336; 427/342
[58] Field of Search .................. 427/336, 342, 246

[56] References Cited

U.S. PATENT DOCUMENTS

| | | | |
|---|---|---|---|
| 3,666,542 | 5/1972 | Kigane et al. | 427/246 |
| 3,672,943 | 6/1972 | Seibert et al. | 427/342 |
| 3,729,536 | 4/1973 | Warwicker | 427/342 |

*Primary Examiner*—Ronald H. Smith
*Assistant Examiner*—Janyce A. Bell

*Attorney, Agent, or Firm*—Sherman & Shalloway

[57] ABSTRACT

A process for producing microporous sheet materials which comprises the step of:

(1) preparing a suspension in an organic solvent of a polyurethane elastomer containing polyoxyethylene segments with or without a polyurethane elastomer not containing these segments;
(2) mixing the resulting organic solvent suspension with water in an amount of not less than 50% by weight based on the polyurethane elastomer in the organic solvent suspension to form a water-in-oil dispersion;
(3) coating or impregnating a substrate with the resulting dispersion;
(4) if desired, partially evaporating the organic solvent from the product so treated;
(5) contacting the coated or impregnated substrate for a short period of time with a coagulant having a coagulation value of not more than 25%, and
(6) drying the product obtained in step (5).

3 Claims, 14 Drawing Figures

PROCESS FOR PRODUCING MICROPOROUS SHEET MATERIALS

1. FIELD OF THE INVENTION

This invention relates to a novel process for economically producing microporous sheet materials having superior mechanical properties and vapor permeability from a dispersion consisting mainly of a polyurethane-type polymer.

2. DESCRIPTION OF THE PRIOR ART

The modern technology has established a widespread method for the production of coriaceous sheet materials of uniform quality having superior properties of natural leather. When these leather-like materials are used for human apparel and shoes, it is important that they should not become stuffy. To achieve this end, various proposals have been made for the method of producing microporous sheet materials having vapor permeability.

Methods heretofore suggested can be roughly classified into wet methods and dry methods.

The wet methods include, for example, a method which comprises coating or impregnating a substrate such as a film or non-woven fabric with a polymer solution either as such or after adding a non-solvent to make it colloidal, immersing the substrate in a coagulating bath comprising a non-solvent either as such or after rendering it humid, extracting the solvent and completely coagulating the polymer thereby to form a microporous product. Other similar methods have also been suggested, but the wet methods commonly include a step of removing the solvent dissolving or dispersing the polymer therein by treating it with a liquid which is miscible with the solvent but inert to the polymer. These methods, however, have the defect that the complete removal of the solvent is time-consuming, considerable installations and expenditures are required to separate the extracted solvent from the coagulating liquid, and that relatively expensive and high-boiling good solvents for polyurethane-type polymers, such as dimethylformamide, dimethylacetamide or dimethyl sulfoxide, must be used. Furthermore, the conventional wet methods are not entirely feasible in providing microporous structures having both satisfactory vapor permeability and durability. Typical examples of the wet methods are disclosed in U.S. Pat. Nos. 3,067,482 and 3,208,875.

As an example of the dry methods, U.S. Pat. No. 3,666,542 discloses a process for producing microporous sheet materials which is more economical than the conventional wet-methods. This process comprises (1) preparing a solution or suspension of a resinous component in an organic solvent having a boiling point of not more than 120° C., the solubility at 25° C. of water in the organic solvent being from 1 to 50 g per 100 g of the organic solvent, the resinous component being selected from the group consisting of (a) a polyurethane-type elastomer containing polyoxyethylene segments in an amount of 2 to 25% by weight (polymer A) and (b) a mixture of polymer A and a polyurethane-type elastomer not containing polyoxyethylene segments (polymer B); (2) mixing the resulting organic solvent solution or dispersion with water in an amount of not less than 50% by weight based on the resinous component in the solution or suspension to form a water-in-oil dispersion; (3) coating or impregnating a substrate with the resulting dispersion; (4) contacting the coated or impregnated substrate with water for a short period of time; (5) selectively evaporating the organic solvent used from the product so treated; and (6) drying the product. The economic aspect of this method is better than that of the wet methods, but it suffers from the defect that the resulting product is somewhat inferior in quality.

SUMMARY OF THE INVENTION

Accordingly, it is an object of this invention to provide a novel process for producing microporous sheet materials having better quality than that of the products obtained by the wet methods with greater economic advantage than the above-cited dry method.

Many other objects and advantages of this invention will become apparent from the following description.

These objects of this invention can be achieved in accordance with this invention by a process for producing microporous sheet materials which comprises the steps of:

(1) preparing a suspension of a resinous component in an organic solvent having a boiling point of not more than 120° C., the solubility at 25° C. of water in the organic solvent being from 1 to 50 g per 100 g of the solvent, the resinous component being selected from the group consisting of (a) a polyurethane-type elastomer containing polyoxyethylene segments in an amount of 2 to 25% by weight (polymer A) and (b) a mixture of polymer A and a polyurethane-type elastomer not containing polyoxyethylene segments (polymer B), the resinous component consisting of 20 to 85% by weight of a part soluble in the organic solvent and 80 to 15% by weight of a part insoluble in the organic solvent;

(2) mixing the resulting organic solvent suspension with water in an amount of not less than 50% by weight based on the resinous component in the organic solvent suspension to form a water-in-oil dispersion;

(3) coating or impregnating a substrate with the resulting dispersion;

(4) if desired, partially evaporating the organic solvent from the product so treated;

(5) contacting the coated or impregnated substrate for a short period of time with a coagulant having a coagulation value, as defined in the specification, of not more than 25; and (6) drying the product obtained in step (5).

BRIEF DESCRIPTION OF THE DRAWINGS

FIG. 1 is an explanatory view showing the method of measuring the wrinkle length in lasting, (a) showing a measuring device, and (b), the state of wrinkle formed in a sheet material;

DETAILED DESCRIPTION OF PREFERRED EMBODIMENTS

First of all, the step (1) of the process of this invention will be described.

The organic solvent used in this invention must have a boiling point of not more than 120° C., and be capable of partially dissolving the polyurethane-type polymer to be described. Furthermore, the solubility of water at 25° C. in the organic solvent should be 1 to 50 g per 100 g of the organic solvent.

Since the process of this invention is a dry method in which the polyurethane-type polymer is coagulated and rendered microporous by evaporation of the organic solvent, organic solvents having a relatively low boiling point are suitable. If the organic solvent has a boiling point far higher than that of water, the rapid coagulation and formation of a microporous structure become difficult. Those having too low a boiling point are not preferred for operational reasons. Hence, the organic solvent used in this invention has a boiling point of not more than 120° C., preferably 100 to 50° C.

When the solubility of water in the organic solvent is too high, a water-in-oil dispersion containing a large quantity of water stably cannot be formed from a dispersion of a polyurethane-type polymer containing polyoxyethylene segments (the polymer being partly dissolved). Generally, the use of organic solvents which scarcely dissolve water is not desirable because the polyurethane-type polymer containing polyoxyethylene segments is difficult to disperse (partly dissolved) in such solvents, and strong stirring is required in order to disperse water finely in such a system to form a water-in-oil dispersion and moreover, the resulting dispersion has poor stability. For the above reason, organic solvents, either singly or as mixtures, having the ability to dissolve water within a restricted range are used in this invention. The preferred solubility of water in the organic solvent is 1 to 25 g per 100 g of the organic solvent. Examples of the organic solvents which meet these requirements are methyl ethyl ketone (MEK for short), methyl n-propyl ketone, methyl isobutyl ketone (MIBK for short), diethyl ketone (DEK for short), methyl formate, ethyl formate, propyl formate, methyl acetate, ethyl acetate, and butyl acetate. Alternatively, organic solvents having a high water solubilizing power, such as acetone, tetrahydrofuran (THF for short) and dioxane may be mixed with organic solvents having a low water solubilizing power, such as benzene, toluene, n-hexane and 1,2-dichloroethane, to adjust the solubility of water in the mixed solvent to 1 to 50 g per 100 g of the mixed solvent, and to allow the mixed solvent to dissolve the polyurethane-type polymer partially. In view of the ease of recovery and the suitable ability to dissolve polyurethane and water, MEK, methyl acetate, a THF/MIBK mixture (weight ratio 60/40 to 20/80), a THF/n-hexane mixture (weight ratio 80/20 to 60/40), and a THF/MEK mixture containing MEK in a proportion of at least 60% by weight are preferred solvents.

The polymer A as one component of the polymer used in this invention is a polyurethane polymer containing 20 to 85% by weight of a part soluble in the organic solvent, and having 2 to 25% by weight of polyoxyethylene segments in the molecule. The polyurethane polymer containing polyoxyethylene segments can be obtained by reacting a diisocyanate compound, a hydrophobic long-chain diol, polyoxyethylene glycol or its derivative, and a low-molecular-weight active hydrogen compound (chain extender).

Usually, polyoxyethylene segments can be introduced into the polymer by using polyethylene ether glycol having a molecular weight of 200 to 4,000 as a reaction component. Also, those derivatives of the polyethylene ether glycol having a molecular weight of 200 to 4,000 which contain at least one active hydrogen atom can also be used as a reaction component for forming the polyurethane-type polymer used in this invention. Examples of such derivatives are $C_1$–$C_8$ monoalkyl esters, monoaryl esters, monoalkyl ethers, and monoaryl ethers of polyethylene ether glycol having a molecular weight of 200 to 4,000, and $\alpha,\omega$-aminopolyoxyethylene and $\alpha,\omega$-iminopolyoxyethylene each having a molecular weight of 500 to 4,000. Copolyether glycols having a molecular weight of 400 to 4,000 and containing an oxyethylene group and an oxyalkylene group with 3 to 8 carbon atoms are also preferred as the reaction component.

Examples of the diisocyanate compounds are 4,4'-diphenylmethane diisocyanate, 1,3-xylylene diisocyanate, 1,4-xylylene diisocyanate, 2,4-tolylene diisocyanate, 2,6-tolylene diisocyanate, 1,5-naphthalene diisocyanate, m-phenylene diisocyanate, and p-phenylene diisocyanate.

Examples of the hydrophobic long-chain diols are substantially hydroxyl-terminated long-chain diols having a molecular weight of 500 to 4,000 such as poly(ethylene adipate), poly(ethylene propylene adipate), poly(ethylene butylene adipate), poly (diethylene adipate), poly(butylene adipate), poly(ethylene succinate), poly(butylene succinate), poly(ethylene sebacate), poly (butylene sebacate), poly(tetramethylene ether glycol), and poly ($\epsilon$-caprolactone diol).

Desirably, the chain-extender consists mainly of a low-molecular-weight aliphatic diol such as ethylene glycol, propylene glycol, diethylene glycol, 1,4-butanediol or 1,6-hexanediol. In one embodiment, the chain extension is carried out to some extent with such an aliphatic diol, and completed by a difunctional amino compound. Examples of such difunctional amino compounds include ethylenediamine, 1,2-propylenediamine, trimethylenediamine, tetramethylenediamine, hexamethylenediamine, decamethylenediamine, m-xylylenediamine, benzidine, 4,4'-diaminodiphenylmethane, m-phenylene diamine, hydrazine, methyl hydrazide, aminoacetic acid hydrazide, and $\omega$-aminopropionic acid hydrazide.

The polyurethane-type polymer can be prepared for example by a procedure which involves forming a substantially isocyanato-terminated prepolymer from polyoxyethylene glycol, a hydrophobic long-chain diol and an excess mole of a diisocyanate, and chain-extending the prepolymer in the above-mentioned solvent. Another method that can be used to prepare the polyurethane-type polymer comprises chain-extending an NCO-terminated prepolymer derived from polyoxyethylene glycol and a diisocyanate with a lesser mole of the difunctional active hydrogen compound to form an NCO-terminated intermediate polymer, mixing it with an NCO-terminated intermediate polymer prepared in the same way from another hydrophobic long-chain diol, and completing the chain extension. Also, polyoxyethylene segments can be introduced by using known methods for preparing copolymerized polyurethanes, such as a method involving end-blocking with a polyoxyethylene glycol monoalkyl ester as a reaction stopper. In any case, it is essential in the present invention that in the polyurethane-type polymer used in this invention, 2 to 25% by weight of polyoxyethylene segments must be present in the polymer as combined with another hydrophobic urethane component. The amount of polyoxyethylene segments in the polyurethane-type polymer is determined by their activity to disperse water stably in the organic solvent defined hereinabove, that is, their activity as an emulsifier to form a water-inoil dispersion. When the amount is less than 2% by weight, the dispersion stability of water is insufficient, and if it exceeds 25% by weight, a water-in-oil dispersion is difficult to prepare. Furthermore, the resulting polymer becomes highly sensitive to water, and in the drying step to be described, pores once formed tend to melt-adhere to each other by the water containing the remaining solvent. Generally, amounts of the polyoxyethylene segments outside the above-specified range are not preferred.

When a polyurethane-type polymer containing more than 25% by weight of polyoxyethylene segments is mixed with a substantially hydrophobic polyurethane-type polymer to adjust the content of polyoxyethylene segments to 2 to 25% by weight based on the total weight of the polymer, and water is added to a dispersion of such a polymer mixture, water can be dispersed stably although for a short period of time. However, in such a dispersion, the dispersed water droplets tend to agglomerate, and the stability of the dispersion is poor. Even when the dispersion is coated on a substrate while it still retains dispersion stability, the water particles agglomerate in the drying step to form a porous structure containing macropores.

Polymer A serves as an emulsifier for the polymer B to be described and another polymer which may be added in a small amount, and is used preferably in an amount of at least 10% by weight based on the total weight of the polymer. There is no upper limit to the amount of polymer A, and the polymer component may consist solely of polymer A. This is because polymer A is a desirable emulsifier for forming a water-in-oil dispersion from an organic solvent and water as described hereinabove, and when the organic solvent is removed from such a dispersion, minute voids formed as a result of removing the organic solvent can be sufficiently retained as polymer A is substantially insoluble in water.

Polymer B used in combination with the polymer A (a polyurethane-type polymer containing polyoxyethylene segments) is a hydrophobic polyurethane-type polymer which can be obtained from a combination of the above-mentioned reaction components excluding the polyoxyethylene glycol and its derivative. Since such a polymer consists of hydrophobic structural units, even when water is mixed with a solution or dispersion of a polymer component consisting solely of this polymer in the above-mentioned organic solvent, a stable mixed dispersion cannot be formed. But when it is combined with polymer A (a polyurethane-type polymer containing polyoxyethylene segments), the hydrophilic residual group of this polymer becomes compatible with the hydrophobic polyurethane-type polymer, and by the polyoxyethylene segments, water can be stably dispersed. Hence, coating and impregnating mixed dispersions suitable for the objects of this invention can be formed.

The resinous component used in this invention consists mainly of polymer A, or both polymer A and polymer B described hereinabove. But in order to improve abrasion resistance, feel and appearance of the final product further, up to 20% by weight, based on the total weight of the polymer, of another polymer can be incorporated. Examples of such other polymers are polyvinyl chloride, polyvinylidene chloride, polyacrylic acid ester copolymers, polymethacrylic acid ester copolymers, polystyrene, copoly (ethylene terephthalate-isophthalate), cellulose acetate, ethyl cellulose, and butyl cellulose.

In the resinous component consisting of polymer A or a mixture of polymer A and polymer B used in this invention, the weight ratio of the part dissolved in the organic solvent to the part not dissolved in it should be 20–85:80–15, preferably 40–75:60–25. By using such a specific dispersion and also employing an operation of contacting a substrate, coated or impregnated with the dispersion, with a specific coagulating agent (organic liquid) having a coagulation value, to be defined hereinbelow, of not more than 25 for a short period of time, the gellation of the polyurethane-type polymer occurs more rapidly than in the method disclosed in U.S. Pat. No. 3,666,542 (the dispersion is not particularly restricted, and the coated or impregnated substrate is contacted with water for a short period of time). Hence, the productivity increases remarkably, and the properties of the resulting microporous sheet material become far superior. When the weight ratio of the dissolved part to the undissolved part is outside the above-specified range, the improving effect in accordance with this invention cannot be obtained.

The organic solvent-insoluble part of the resinous component is defined by the following method.

A certain amount of an organic solvent dispersion of polyurethane is placed in a three-necked flask equipped with a stirrer and held at 70° C. With stirring, the same solvent as used in the dispersion is added to the dispersion to adjust its concentration to about 5%. Then, the temperature is lowered, and with stirring, the dispersion is cooled down to 20° C. 20 g of the uniform dispersion is taken into each of four centrifugal sedimentation tubes. At 20° C., the dispersion in each of the tubes is allowed to sediment centrifugally for 7 minutes at 1500 rpm. The supernatant liquid (dissolved part) is recovered by decantation, and the remaining polymer part is dried to a constant weight and weighed. The weight as an average of four replicates is designated as $W_s$.

20 g of the same dispersion is taken into a weighing bottle at the time of taking the dispersion into the four sedimentation tubes, and evaporated to dryness. The weight of the polymer so obtained is designated as $W_t$.

The amounts of the undissolved part and the dissolved part are calculated from the following equations.

Amount of the undissolved part $= (W_s/W_t) \times 100$

Amount of the dissolved part $= (W_t - W_s/W_t) \times 100$

The adjustment of the weight ratio of the organic solvent-soluble part to the organic solvent-insoluble part to 20–85:80–15 can be effected when preparing the polyurethane-type polymer or its dispersion. The amount of the organic solvent-insoluble part is affected by the type of the organic solvent used, the molecular weight of the polymer diol, the type of the chain extender, the molar ratio of the chain extender to the polymer diol (R'), the amount of the isocyanate in the molecular chain (the nitrogen content of the urethane or urea group), and the concentration of the polyurethane-forming materials at the start of the reaction. These conditions can be easily prescribed experimentally so as to obtain a dispersion with the desired ratio between the organic solvent-insoluble part and the organic solvent-soluble part. For example, a dispersion containing a larger proportion of the insoluble part can be obtained by using an organic solvent having a low ability of dissolving, a polymer diol having a somewhat low molecular weight (500 to 1,500) and a straight-chain diol or diamine as a chain extender (or increasing the amount of the chain extender), increasing the molar ratio of the chain extender to the polymer diol (R'), and increasing the concentration of the polyurethane-forming materials at the start of the reaction.

Another method for obtaining a desired weight ratio between the soluble part and the insoluble part involves mixing polurethane containing a major proportion of a soluble part or consisting only of the soluble part with a polyurethane dispersion containing a major proportion of an insoluble part in suitable ratios. Or a polyurethane solution containing a major proportion of a soluble part or consisting only of the soluble part is mixed with a polyurethane powder not soluble in the solvent (organic solvent) in the solution.

The polyurethane polymer so obtained and meeting the above conditions has an R' of 2.0 to 4.0.

The content of the solid resin in the dispersion is 10 to 30% by weight, preferably 15 to 25% by weight.

In the step (2) of the process of this invention, the organic solvent suspension described above is mixed with at least 50% by weight, preferably 100 to 250% by weight, based on the total weight of the polymer in the dispersion, to form a water-in-oil dispersion. The water added retains the polymer very stably in the water-in-oil dispersion by a synergistic effect of using the polymer containing a hydrophilic group and a hydrophobic group and the organic solvent having a specific water solubilizing power. The water-in-oil dispersion assumed a white creamy state, and water is emulsified and dispersed by the specific polymer described above.

The required amount of water is determined according, for example, to the content of polyoxyethylene segments in the polymer, the concentration and temperature of the polymer dispersion, and the temperature and humidity of the atmosphere in which the microporous material is made, but should be not less than 50% by weight of the amount of the resinous component in the organic solvent suspension. In the present invention, only the selective evaporation of the organic solvent, after coating or impregnating the dispersion on a substrate, substantially affords a microporous structure. When the amount of water added is less than 50% by weight of the polymer, microporous structures with open pores cannot be obtained however other conditions may be controlled. The maximum allowable amount of water is one which does not cause phase separation to the water-in-oil dispersion. Since the dispersed water is present in the dispersion, a surprisingly large quantity of water can be introduced into the system. For example, in the case of a methyl ethyl ketone dispersion (concentration 18% at 30° C.) of polyurethane containing 8% by weight of polyoxyethylene segments, even when 500% by weight, based on the weight of the polymer, is added, the resulting water-in-oil dispersion is very stable.

Such a water-in-oil type dispersion can be prepared by various methods such as (1) a method involving adding water to an organic solvent suspension of the polymer batchwise, and (2) a method which comprises continuously mixing an organic solvent suspension of the polymer with water. In any of these methods, the operation is easy because an organic solvent having a restricted degree of water solubilizing is used, and a localized coagulation and precipitation of the polymer does not substantially occur when water is added. If desired, other known additives such as dyes, pigments, cross-linking agents, stabilizers or fillers can be incorporated in such amounts that do not destroy the stable dispersion.

In the step (3) of this invention, the mixed dispersion so obtained is coated on or impregnated in a substrate. Usually, the water-in-oil dispersion to be used has a solids content of 5 to 30% by weight, preferably 8 to 20% by weight. Various substrates can be used in the step (3) according to the end use of the resulting microporous sheet material. For example, various kinds of knitted or woven or nonwoven fabrics or the like can be used. When the dispersion is coated on a suitable support and removed from it after evaporation to dryness, a film-like microporous structure useful as an outer skin of artificial leather can be obtained. Examples of the support are plastic films, silicone papers, and polished glass sheets, metal plates or metal foils.

The coating or impregnation of the substrate with the water-in-oil dispersion can be performed by usually known means, for example, a coating method, a dipping method or a combination of these methods. There is no particular restriction on the take-up of the dispersion in the substrate. But usually, the take-up of the dispersion is about 300 to 1,500% by weight based on the substrate.

The substrate so coated or impregnated with the mixed dispersion is then brought into contact with a coagulating agent having a coagulation value of not more than 25. Prior to contacting, the organic solvent in the substrate is preferably evaporated partially (step (4)). In the dry method, the migration of the polymer tends to take place in the drying step, and this causes the non-uniformity of the density of the sheet material. Migration of the polymer occurs at an unstable time when a considerable amount of the organic solvent has been removed and gellation begins. By contacting the coated or impreganted substrate with the coagulating agent having a coagulation value of not more than 25, gellation is rapidly initiated, and the migration of the polymer can be minimized. Accordingly, by partially evaporating the organic solvent in the substrate prior to contact with the coagulating agent, voids are formed, and the penetrability of the coagulating agent into the substrate is improved. This correspondingly quickens the gellation. Thus, it is preferred to evaporate the organic solvent partially prior to contacting with the coagulating agent. For example, 5 to 40% by weight of the organic solvent is evaporated off in this step.

The coagulating agent used for contact with the substrate in step (5) of the process of this invention has a coagulation value measured at 40° C. of not more than 25.

The coagulation value of the coagulating agent used in the invention is defined as follows:

500 g of a polymer dispersion having a concentration of 20% by weight is taken, and with stirring by a homomixer, 175 g of water is added to the dispersion over the course of 5 minutes. Stirring is performed for an additional 5 minutes to form a mixed dispersion. The temperature of the mixed dispersion is adjusted to 40 ± 2° C., and an organic liquid as the coagulating agent is added at a rate of 1 g/minute. The amount of the organic liquid added until the mixed dispersion of the polymer is destroyed and phase separation occurs is measured, and calculated for 100 g of the mixed polymer dispersion. The value obtained is defined as the "coagulation value".

The coagulation value somewhat varies according to the solvent and the composition of the polyurethane. Generally, preferred coagulating agent having a coagulation value of not more than 25 are alcohols containing 1 to 8 carbon atoms and hydrocarbons such as methanol, ethanol, propanol, isopropanol, butanol, hexane, heptane, and octane. Of these, methanol, ethanol, propanol and isopropanol are especially preferred. The dipping method is preferred for contacting the substrate with the coagulating agent. Other methods such as a spraying method can also be used if a uniform contact can be secured. The higher the temperature of the coagulating agent is, the more rapid is the diffusion of the coagulating agent into the substrate. Suitable temperatures are 20 to 50° C. The time required for contact with the coagulating agent is usually 10 to 180 seconds, preferably 30 to 120 seconds.

The polyurethane-type polymer used in this invention contains 15 to 80% by weight of a portion which is insoluble in the organic solvent and is in the gelled state. By the contacting of the coated or impregnated substrate with the coagulating agent for a short period of time, the gellation of the polymer occurs rapidly. Furthermore, as a result of contacting with the coagulant having a small coagulation value, the destruction of the water-in-oil mixed dispersion takes place rapidly, and therefore, the migration of the resin in the step of evaporating the remaining organic solvent is prevented, and a substrate having uniform density can be obtained. This greatly contributes to the prevention of wrinkles at the time of lasting, the reduction of the surface roughness (orange peel effect) at the time of stretching, the increase of suppleness and durability, etc.

In step (6) of drying the substrate after dipping in the coagulating agent, the rate of drying can be raised without causing migration of the polymer since the polymer has already been gelled in the previous step of contacting with the coagulating agent for a short period of time, and the solvent used has a medium degree of dissolving power for polyurethanes. In the conventional dry method (U.S. Pat. No. 3,666,542), the selective evaporation of the solvent in the drying step after impregnation must be carried out under mild conditions in order to inhibit the migration of the polymer. For example, it is necessary to evaporate the solvent in an atmosphere kept at a temperature of not more than 35° C. and a relative humidity of 60% and an air flow velocity of 2 meters/sec. while inhibiting the evaporation of water. This is because in the method of U.S. Pat. No. 3,666,542 in which water having a coagulation value of at least 35 is used as the coagulating agent, the gellation does not rapidly take place, and when drying is subsequently done abruptly, the migration of the polymer cannot be avoided.

Since in the present invention, the polymer has already been gelled to some extent, it is not necessary to evaporate the organic solvent selectively, but the resulting product can be treated in a dryer not containing an ordinary moisture-adjusting device at high temperatures. Specifically, the drying can be carried out at 40 to 120° C. for 10 to 30 minutes, and the rate of drying can be doubled over the conventional dry method.

When in the conventional wet method, a non-woven fabric impregnated with a dimethyl formamide solution of polyurethane is dipped in water or methanol as a coagulating agent, gellation of the polymer occurs temporarily. But since the solvent remains substantially unextracted upon contact with the coagulating agent for a short period of time if the non-woven fabric is dried by the dry method, the gelled polymer is redissolved, and therefore, the migration of the polymer in the drying step is very great, and the cohesive density of the resin becomes extremely high. Accordingly, the solvent must be extracted and removed in the coagulating bath over a long period of time.

According to the method of this invention, microporous structures can be produced rapidly and economically, and can be utilized in various forms. For example, the product obtained by using a knitted or woven or non-woven cloth or the like as the substrate can be used either as such or bonded to another substrate. In some cases, a separately prepared film-like microporous structure is adhered as an outer skin to the resulting product. These structures can be used widely as leather substitutes in the fields of shoe uppers, bags or apparel.

The following Examples and Comparative Example illustrate the present invention in greater detail. Unless otherwise specified, all parts and percents in these examples are by weight. The various properties shown in the examples were measured by the following methods.

Bending stiffness

A rectangular specimen, 2.5 cm wide and 30 cm long, is allowed to protrude from a horizontal stand. The protruding length (1 cm), the protruding angle [$\theta$; an angle formed between the extension of the specimen on the horizontal plane of the stand and the line connecting the starting point of protrusion (the end of the horizontal stand) and the protruding end of the specimen], the weight (W, g/cm$^2$) and the thickness (h) of the specimen are measured, and the flexural rigidity is calculated from the following equation.

$$Rc = Wl^3 \cdot \frac{\cos\frac{\theta}{2}}{8\tan\theta} \text{ (g} \cdot \text{cm)}$$

$$\text{Flexural rigidity} = \frac{12 \cdot R_c}{h^3} \text{ (kg/cm}^2\text{)}$$

Smaller values show greater suppleness.

Figure 1A:
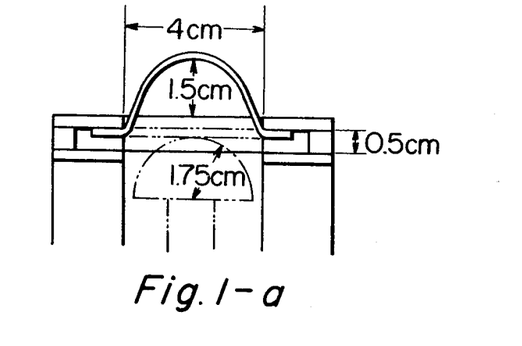
Figure 1B:
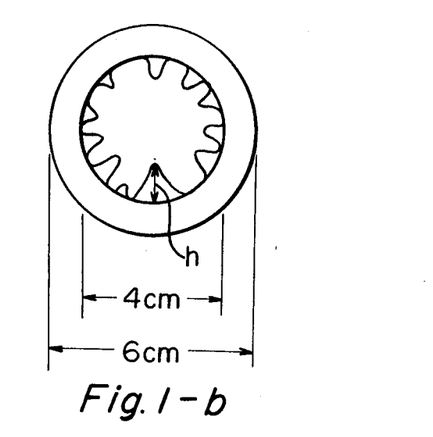

Wrinkle length in lasting (see FIG. 1)

A circular specimen, 6 cm in diameter, is placed concentrically between two sheets perforated with a circular hole having a diameter of 4 cm and spaced from each other by a distance of 5 mm. Then, they are set in a device provided with a hemispheric dome-like lifting member having a radius of curvature of 1.75 cm so that the center of the circular specimen, the centers of the circles in the support sheets, and the apex of the hemisphere are in agreement with one another. Then, the hemispheric lifting member is raised 1.5 cm above the topmost surface of the stand. At this time, the specimen is deformed so that it is drawn in a hemispherical shape by the supporting circular sheets and the hemispheric lifting member. But wrinkles are formed on the specimen as a result of being unable to be absorbed by this drawing deformation. The top of each of the wrinkles is marked on the surface of the test specimen. The shortest distance between the line of contact of the specimen with the supporting circular sheets and the top of the largest wrinkle, is measured while the specimen is placed flat, and is made the wrinkle length in lasting (see FIG. 1-b). Smaller values show better processability.

Figure 2:
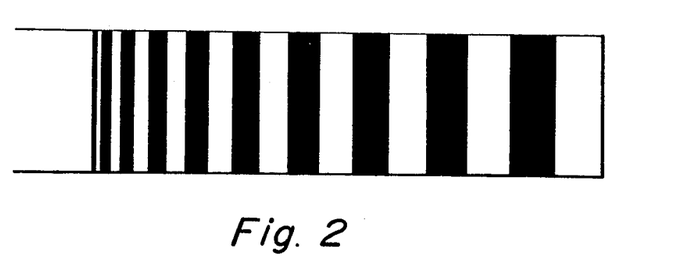
FIG. 2 is a schematic view of a standard discriminator sheet for the measurement of the unevenness of a sheet material.

Degree of Unevenness (1) Standard discriminator sheet (see FIG. 2)

As shown in FIG. 2, a black-and-white straight-line patterned sheet is used. The pattern is drawn on a sheet of white paper, and consists of ten pairs of black and white rectangles. In each pair, the black and white rectangles have the same width, and the width is varied from 1 mm to 10 mm progressively from left to right in FIG. 2.

(2) Test specimen

A black soft vinyl resin tape with a flawless lustrous surface is bonded to the surface of a test specimen, 2.5 cm wide and 9 cm long.

(3) Method of measurement

The test specimen is set on a stretching fixed stand with both end parts each measuring 2 cm in length being held onto the stand. The standard discriminator sheet is placed horizontally 5 cm just above the surface of the test specimen. The standard discriminator sheet is moved to left and right to reflect the pattern on the vinyl resin tape bonded to the specimen. The degree of unevenness is defined as the minimum width of the rectangles which allows the black-and-white pattern reflected on the tape to be perceived as complete black and white two rectangles.

The "static unevenness" is the degree of unevenness of the surface of the test specimen when the specimen is not subjected to deformation by stretching. The "unevenness at 20% stretch" means the degree of unevenness of the surface of the specimen after subjecting the specimen to 20% stretch.

When the test specimen is uneven on its surface, the black-and-white pattern is reflected distortedly, and rectangles with smaller widths are distorted to a greater degree and more difficult to perceive. Rectangles with larger widths are reflected more straight and can be perceived as clear black and white patterns without their intertwining. For example, if with a given specimen, black and white rectangular sections with a width of 5 mm or more can be perceived, the degree of unevenness of the specimen is 5.

Resistance to bending

Measured in accordance with JIS K-6505.

EXAMPLE 1

A. Preparation of the Polyurethane Polymer:

A reactor was charged with 1000 parts of 4,4'-diphenylmethane diisocyanate kept at 50° C., 2047 parts of polyethylene adipate (molecular weight 2000) kept at 60° C., 155 parts of polyethylene glycol (molecular weight of 1500) and 0.96 part of triethylene diamine, and they were reacted for 80 minutes at 80° C. in a stream of nitrogen. The reaction mixture was added to 800 parts of methyl ethyl ketone (MEK) to form a solution having a polymer concentration of 80%, and a solution of 254 parts of 1,4-butanediol and 6 parts of triethylenediamine in 3200 parts of methyl ethyl ketone was added. The reaction was initiated at 75° C. While adding methyl ethyl ketone dropwise continuously so that the reaction mass did not solidify, the reaction was performed for 12 hours until the concentration of the polymer became 20%. The resulting polyurethane consisted of 65% of a portion soluble in methyl ethyl ketone and 35% of a portion insoluble in it. The solution had a viscosity at 70° C. of 680, and the insoluble part was in the form of particles having a particle size of less than 3 microns. The intrinsic viscosity of the polyurethane measured at 30° C. in dimethyl formamide was 0.98.

B. Preparation of Mixed Dispersion for Impregnation:

The dispersion of polyurethane polymer prepared in A above was diluted with methyl ethyl ketone to a concentration of 17%. 425 parts of carbon black and 4 parts of silicone oil were added to 1000 parts of the diluted dispersion. With stirring by a homomixer, 400 parts of water was added dropwise to the mixed dispersion over the course of 7 minutes. After the addition, the mixture was stirred for 5 minutes. The resulting mixed dispersion had a viscosity at 40° C. of 1700 cps.

C. Preparation of Mixed Dispersion for Coating:

3.5 parts of carbon black and 4 parts of cosmetic oil were added to 1000 parts of the polyurethane dispersion prepared in A above. To the mixture was added 300 parts of water with stirring by a homomixer over the course of 5 minutes. After the addition, the mixture was stirred for 5 minutes. The resulting mixed dispersion had a viscosity of 2800 cps at 40° C.

D. Preparation of Non-Woven Fabric:

Highly shrinkable polyethylene terephthalate fibers having a shrinkage of 52% in warm water at 70° C. (denier size; 1.2 denier; fiber length, 51 mm) were mixed with polyethylene terephthalate fibers not shrinkable in warm water at 70° C. (denier size, 0.5 denier; fiber length, 38 mm) in a ratio of 50:50, and formed into a web having a basis weight of 130 g/m$^2$ by a card and a cross-layer. The web was then punched by a needle loom equipped with needles (No. 46) made by The Torrington Co. at a density of 800/cm$^2$. The resulting product was allowed to shrink in warm water at 70° C. to 60% of the original area. It was then processed on a belt pressing machine at a pressure of 0.2 Kg/cm$^2$ and a temperature of 130° C. for 4 minutes to form a non-woven fabric having a thickness of 1 mm and a basis weight of 200 g/m$^2$.

E. Production of Microporous Sheet Material by the Method of the Invention:

The non-woven fabric produced in D was dipped in the impregnating dispersion prepared in A above and maintained at 40° C., and then squeezed by nip rolls to adjust the amount of the dispersion impregnated to 1200 g/m$^2$. The non-woven fabric was then passed through 20 times its weight of methanol at 35° C. for 30 seconds, and then dried by a dryer at a temperature of 60° C. and an air flow velocity of 2 m/second for 10 minutes and further by a dryer at a temperature of 100° C. and an air flow velocity of 2 m/second for 10 minutes. The methanol used as a coagulating agent contained 0.5% of methyl ethyl ketone.

Figure 3:
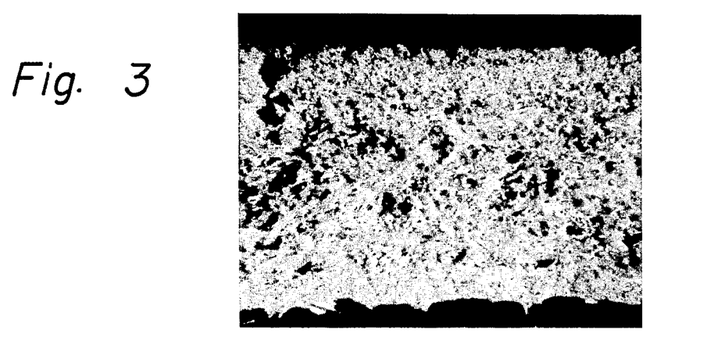
FIGS. 3 to 7 each are a sectional view of a microporous sheet material of this invention.

The resulting sheet had superior suppleness, and the adhesion of the impregnating resin to the non-woven fabric was uniform with very little migration (see FIG. 3). The sheet was designated as an impregnated substrate.

The nap on the surface of this substrate was pressed down using an ironing machine at 120° C. without reducing the thickness of the substrate. The coating dispersion prepared in C was coated at a rate of 1600 g/m$^2$ on the substrate, and dried for 35 minutes at a temperature of 35° C., a humidity of 70%, and an air flow velocity of 0.2 m/second, and for another 25 minutes at a temperature of 65° C. and a relative humidity of 50% to remove the solvent almost completely. Water was removed by drying at 80° C. for 15 minutes. A coating agent containing carbon black was gravure-coated on the resulting microporous sheet, and a calf leather-like pattern was transferred onto it by a hot roll to form a leather substitute sheet (this is designated as a coated substrate).

The sheet obtained had superior surface smoothness, and showed little surface roughness when it was elongated. Shoe uppers prepared from this sheet had very good surface smoothness and very high resistance to repeated bendings.

The conditions and results obtained in the above and following Examples and Comparative Examples are shown in Table 1.

EXAMPLE 2

Example 1 was repeated except that the non-woven fabric was passed through the methanol for 120 seconds.

The resulting microporous structure presented extremely reduced migration of the impregnated resin, and had especially superior suppleness, resistance to bending and surface smoothness. No wrinkle occurred at the time of lasting shoes. It was very desirable as a substitute for natural leather.

EXAMPLE 3

A. Preparation of Polyurethane Polymer Dispersion:

A reactor was charged with 1000 parts of 4,4'-diphenylmethane diisocyanate, 1572 parts of polyethylene adipate (molecular weight 2000), 134 parts of polyethylene glycol and 0.9 part of triethylene diamine. They were reacted for 100 minutes at 70° C. in an atmosphere of nitrogen to form a prepolymer. 746 Parts of methyl ethyl ketone was added to the prepolymer to adjust the concentration of the prepolymer to 80%. A solution of 276 parts of 1,4-butanediol and 4.5 parts of triethylenediamine in 1242 part of methyl ethyl ketone was added to the prepolymer solution. With stirring, the reaction was initiated at 60° C. When the reaction temperature reached 80° C., the rate of adding methyl ethyl ketone was adjusted so that the amount of electric power consumed by the stirring motor became constant. Until the concentration of the polymer became 35%, this constant amount of electric power was maintained. The reaction time was 8 hours. Then, 4.5 parts of acetyl hydrazide was added as an end-blocking agent, and the dispersion was further diluted with methyl ethyl ketone to adjust the concentration of the polymer to 20%. The resulting polyurethane dispersion consisted of 28% of a portion soluble in methyl ethyl ketone and 72% of a portion insoluble in it, and had a viscosity at 70° C. of 550 cps. The insoluble portion was in the form of particles with a size of 1 to 5 microns. The intrinsic viscosity of the polymer, as measured in dimethyl formamide at 30° C., was 0.95.

B. Preparation of Impregnating Dispersion

The polyurethane dispersion obtained in A above was diluted with methyl ethyl ketone to a concentration of 17%, and to 100 parts of this dispersion were added 4.25 parts of titanium oxide and 4.5 parts of cosmetic oil. With stirring by a homomixer, 350 parts of water was added to the resulting mixture over the course of 7 minutes. After the addition, the mixture was further stirred for 5 minutes. The resulting mixed dispersion had a viscosity at 40° C. of 1,400 cps.

C. Preparation of Coating Mixed Dispersion 5 parts of titanium oxide and 5 parts of cosmetic oil were added to 1,000 parts of the polyurethane dispersion prepared in A, and with stirring by a homomixer, 350 parts of water was added over the course of 7 minutes. After the addition, the mixture was stirred for an additional 5 minutes. The resulting mixed dispersion had a viscosity at 40° C. of 3,050 cps.

D. Preparation of Microporous Structure by the Method of the Invention

The same non-woven fabric as prepared in D of Example 1 was dipped in the impregnating dispersion prepared in B above and maintained at 40° C., and squeezed by nip rolls so that the amount of the dispersion impregnated became 1200 g/m$^2$. Then, the non-woven fabric was exposed to an atmosphere at a temperature of 35° C. and a relative humidity of 70% for 8 minutes, and then passed through 20 times its weight of a methanol coagulating bath at 35° C. for 30 seconds. It was then subjected to a first-step drying at 60° C. and at an air flow velocity of 2 m/second, and a second-step drying at 100° C. and at an air flow velocity of 2 m/second, each for 10 minutes. The methanol used as a coagulant contained 0.48% of methyl ethyl ketone.

Figure 5:
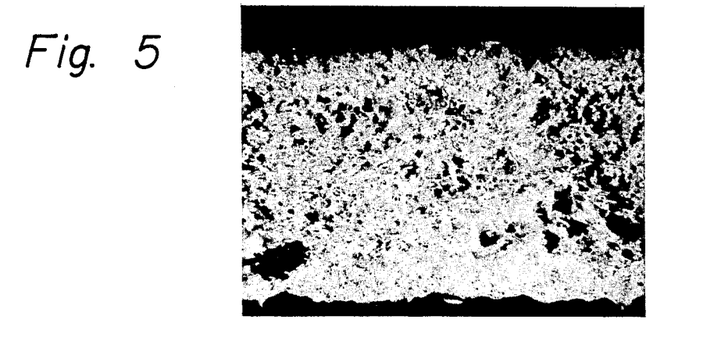

The resulting impregnated substrate showed extremely reduced migration, and had superior suppleness. When it was bent, the occurrence of sharp folded lines was very much reduced. The impregnated substrate was therefore satisfactory as a substrate for artificial leather (see FIG. 5).

The nap on the substrate was pressed down by an ironing machine at a surface pressure of 0.05 Kg/cm$^2$ for 30 seconds. The dispersion prepared in C above was coated on the surface of the substrate in an amount of 1700 g/m$^2$. The coated product was allowed to stand for 20 minutes at a temperature of 35° C. and a relative humidity of 70%, and dipped in methanol at 35° C. for 30 seconds. Then, it was dried for 20 minutes in a dryer kept at a temperature of 60° C. and a relative humidity of 50%, and then for 15 minutes at 80° C. A polyester-urethane coating agent containing 10%, based on the weight of the polymer, of titanium oxide was applied to the surface of the resulting microporous sheet by means of gravure-coating rolls to form a coating in an amount of 30 g/m$^2$. The sheet obtained had a smooth surface, and when bent, it developed preferable creases like natural leather. It also had superior resistance to bending.

Using this sheet, sport shoes were lasted using a toe-elaster. There was no occurrence of wrinkles, and the sheet was very preferable as a shoe-upper leather substitute.

EXAMPLE 4

Example 3 was repeated except that a mixture of 50% of tetrahydrofuran (THF) and 50% of methyl isobutyl ketone (MIBK) was used instead of the methyl ethyl ketone used in Example 1. The resulting polyurethane dispersion consisted of 72% of a portion dissolved in the solvent and 28% of a portion insoluble in the solvent. The dispersion with a concentration of 20% had a viscosity at 70° C. of 700 cps, and the insoluble portion was particulate with a particle size of less than 1 micron. The intrinsic viscosity of the polyurethane, as measured in dimethyl formamide at 30° C., was 1.02.

The polyurethane dispersion obtained was diluted to a concentration of 17% with the same mixed solvent as described above, and then, 400 parts of water was added to 1,000 parts of this dispersion under the same conditions as in Example 3. The resulting mixed dispersion had a viscosity at 40° C. of 1,800 cps.

Figure 6:
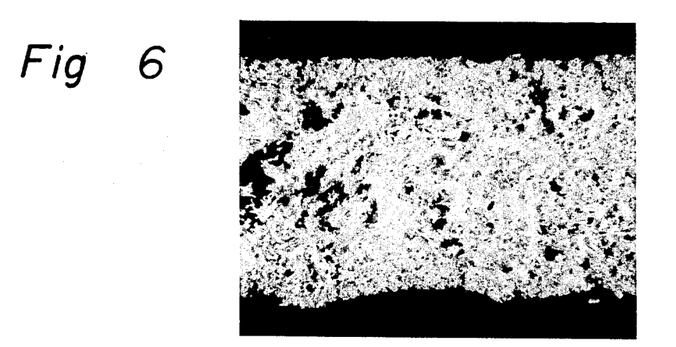

The same non-woven fabric as used in Example 1 was impregnated with this mixed dispersion so that the wet pick-up of the dispersion became 1,300 g/m$^2$, and then allowed to stand for 5 minutes in an atmosphere kept at a temperature of 40° C. and a relative humidity of 80%, and dipped for 60 seconds in 20 times its weight of an isopropyl alcohol coagulating bath at 45° C. Then, it was dried for 60 seconds at 45° C., then for 8 minutes at 80° C., and finally for 10 minutes at 100° C. The resulting impregnated substrate was satisfactory for artificial leather since it showed very much reduced migration of the polymer, had superior suppleness, and did not develop sharp folded corners upon bending (see FIG. 6).

The nap on the surface of this substrate was pressed down by an ironing machine at 115° C. for 1 minute. 350 Parts of water was added to 1,000 parts of the polyurethane dispersion having a concentration of 20% as obtained above with stirring by a homomixer. The resulting mixed dispersion was coated on the surface of the substrate to a wet pick-up of 1,820 g/m², allowed to stand in an atmosphere at a temperature of 40° C. and a relative humidity of 70% for 8 minutes, and passed through isopropyl alcohol in an amount 20 times the weight of the coating dispersion for 60 seconds. Then, it was dried for 30 minutes at a temperature of 60° C. and a relative humidity of 50% to remove almost all the solvent, and further dried at 100° C. for 10 minutes.

The resulting microporous sheet material was satisfactory as a shoe-upper since it had superior suppleness and a smooth surface, and no unevenness occurred on the surface when it was elongated.

EXAMPLE 5

A. Preparation of Polyurethane

2060 Parts of polymer glycol having a molecular weight of 1,700 and obtained by polycondensing adipic acid with a diol component consisting of a 80:20 mixture of 1,4-butanediol and neopentyl glycol and 156 parts of polyethylene glycol having a molecular weight of 1,500 was added to a solution consisting of 1,000 parts of 4,4'-diphenylmethane diisocyanate, 0.9 part of triethylenediamine, 640 parts of methyl ethyl ketone and 160 parts of tetrahydrofuran. The mixture was heated at 80° C. for 80 minutes in an atmosphere of nitrogen. Then, a solution of 225 parts of 1,4-butanediol and 6 parts of triethylenediamine in 1,860 parts of methyl kethyl ketone and 464 parts of tetrahydrofuran was added to the resulting reaction mixture. The reaction was initiated at 75° C., and when the reaction temperature reached 78° C., a 4:1 mixture of methyl ethyl ketone and tetrahydrofuran was continuously added dropwise, and the reaction was carried out for 12 hours until the concentration became 20%.

The resulting polyurethane consisted of 80% of a portion soluble in the above mixed solvent and 20% of a portion insoluble in it. The insoluble portion was particulate with a particle size of less than 1 micron. The mixed dispersion obtained had a viscosity at 70° C. of 540 cps, and the intrinsic viscosity of this polyurethane, as measured at 30° C. in dimethyl formamide, was 0.94.

B. Preparation of Impregnating and Coating Dispersions

The procedure of Example 1 was repeated except that the polyurethane dispersion obtained in A above was used. The resulting impregnating dispersion had a viscosity at 40° C. of 1,600 cps, and the coating dispersion had a viscosity at 40° C. of 2,600 cps.

C. Preparation of Microporous Sheet Material

Figure 7:
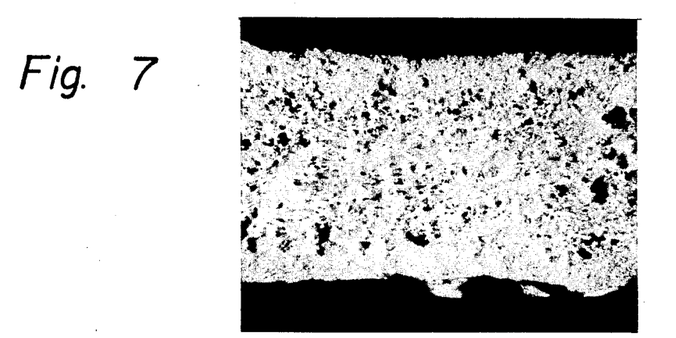

The same non-woven fabric as used in Example 1 was dipped in the impregnating dispersion prepared in B above, and squeezed by nip rolls to a wet pick-up of 1,450 g/m². The non-woven fabric was then dipped for 120 seconds at 25° C. in n-hexane in an amount of 25 times the weight of the impregnated dispersion, and dried for 15 minutes by a dryer at a temperature of 60° C. and an air flow velocity of 2 m/second, and for 10 minutes at a temperature of 80° C., and finally dried at 100° C. for 5 minutes to remove the remaining water. The resulting substrate had useful properties as a substrate for artificial leather since it showed reduced migration of the resin and had superior supplensss (see FIG. 7).

The nap on the surface of the substrate was pressed down by bringing it into pressure contact with a drum surface at a temperature of 120° C. and a surface pressure of 0.05 Kg/cm². Then, the coating dispersion prepared in B above was coated on the surface in an amount of 1,600 g/m², and dried under the same conditions as in Example 1.

The resulting microporous sheet material had suppleness and high resistance to bending, and when it was bent, no sharp folded corner was formed. Thus, it had characterististics like natural leather, and was suitable as a shoe-upper material because the unevenness on the surface was reduced.

COMPARATIVE EXAMPLE 1

Polyurethane was prepared by performing polymerization under the same conditions as in Example 1 except that a mixed solvent consisting of 60% of dimethyl formamide (DMF) and 40% of methyl ethyl ketone was used. The resulting polyurethane solution did not contain a portion insoluble in the mixed solvent, but was a clear solution having a viscosity at 70° C. of 1,200 cps. The intrinsic viscosity of the polyurethane, as measured in dimethyl formamide at 30° C., was 1.04.

The resulting solution was diluted with the same mixed solvent to a concentration of 12.1% from the original 20% (no mixing of water). The solution had a viscosity at 40° C. of 1,400 cps. The same non-woven fabric as used in Example 1 was coated with the resulting solution, and squeezed by nip rollers to a wet pick-up of 1,200 g/m². Then, it was passed for 30 seconds through methanol at 35° C. in an amount of 20 times the weight of the wet substrate, and then dried for 10 minutes in a dryer at a temperature of 60° C. and an air flow velocity of 2 meters/second, and for 10 minutes at 100° C.

Figure 8:
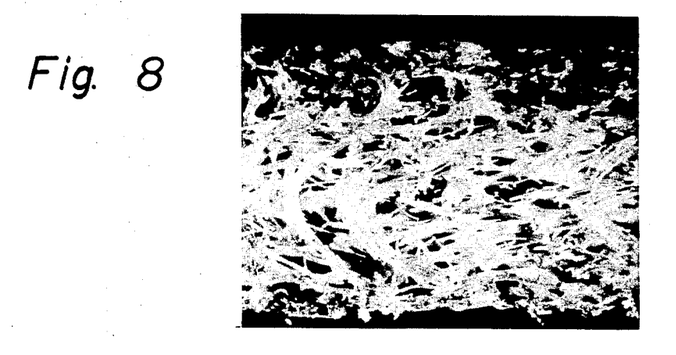
FIGS. 8 to 13 each are a sectional view of a sheet material for comparison.

The resin pick-up was 145 g/m² which was the same as in Example 1. But there was a marked migration of the resin. The hardness of the substrate was high, and sharp folded lines tended to occur (FIG. 8).

The resulting product was processed by an ironing machine at 120° C. in the same way as in Example 1 to form a microporous sheet, and the same coating agent as in Example 1 was coated on it to form a final sheet.

The resulting leather-like sheet material was hard and contained a number of raised and depressed portions on its surface. When it was elongated, the surface roughness increased. The resistance to bending was also inferior. The sheet was therefore unsatisfactory as a shoe-upper material.

COMPARATIVE EXAMPLE 2

Figure 9:
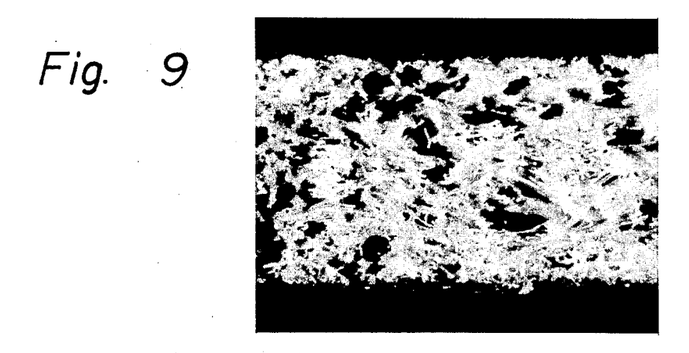

The polyurethane dispersion obtained in A of Example 1 was diluted to a concentration of 12.1% (no mixing of water), and applied to the same non-woven fabric as used in Example 1 in the same way as in Comparative Example 1. The migration of the resin was somewhat reduced, but the hardness of the resulting sheet was somewhat high, and the wrinkle length in lasting was also large. The sheet was therefore not satisfactory as a shoe-upper material (see FIG. 9).

COMPARATIVE EXAMPLE 3

Figure 10:
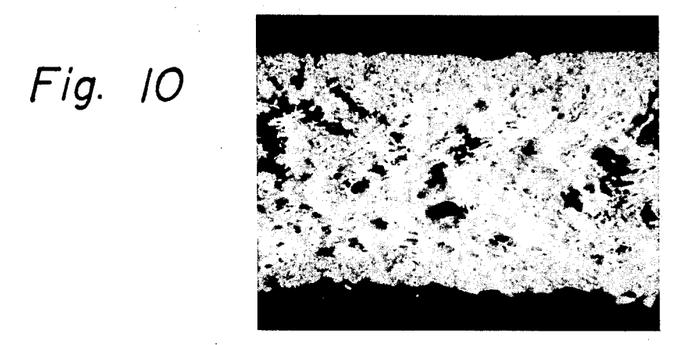

The procedure of Example 1 was repeated except that n-amyl alcohol (having a coagulation value of 28) was used as a coagulant instead of the methanol. Migration of the resin occurred in the resulting sheet, and its hardness was high. The sheet obtained was therefore inferior to that obtained in the Examples. (see FIG. 10).

COMPARATIVE EXAMPLE 4

Figure 11:
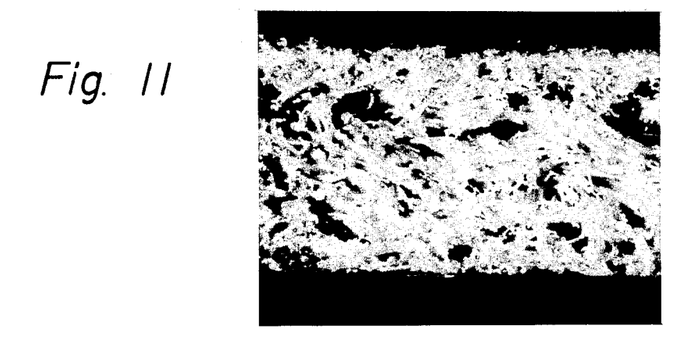

The same procedure as in Example 1 was repeated except that the coagulating agent was not used and the step of dipping the substrate in the coagulating agent was omitted. The resulting sheet showed a great migration of the resin and a high hardness, and the properties of the sheet were inferior to those obtained in the Examples (see FIG. 11).

COMPARATIVE EXAMPLE 5

A reactor was charged with 750 parts of 4,4'-diphenylmethane diisocyanate maintained at 50° C., 1300 parts of polyethylene adipate having a molecular weight of 1,625 and maintained at 60° C. and 300 parts of polyethylene glycol having a molecular weight of 1,500, and they were reacted at 80° C. for 80 minutes in an atmosphere of nitrogen. A mixture consisting of 170 parts of 1,4-butanedoil, 3780 parts of methyl ethyl ketone and 3 parts of triethylenediamine was added to the reaction mixture, and the resulting mixture was reacted at 70° C. for 10 hours. The resulting product was diluted with methyl ethyl ketone to a concentration of 20%. The resulting polyurethane consisted of 87% of a portion soluble in the methyl ethyl ketone and 13% of a portion insoluble in it. The polyurethane dispersion had a viscosity at 70° C. of 600 cps. The intrinsic viscosity of the polyurethane, as measured in dimethyl formamide at 30° C., was 0.92. (R'=1.89, nitrogen content 3.3%)

Methyl ethyl ketone was added to the polyurethane dispersion to a concentration of 17%. 4.25 Parts of carbon black and 4 parts of corn oil were added to 1,000 parts of the polyurethane dispersion, and 400 parts of water was added over the course of 7 minutes to the resulting mixture with stirring by a homomixer. The resulting mixed dispersion had a viscosity at 40° C. of 1.560 cps.

The same non-woven fabric as used in Example 1 was impregnated with the resulting mixed dispersion, and squeezed by rollers to a wet pick-up of 1,200 g/m$^2$. The non-woven fabric was then dipped for 30 seconds in water at 30° C., and dried for 40 minutes in an atmosphere held at a temperature of 30° C. and a relative humidity of 70% (method A), or dried with hot air at 60° C. at an air flow velocity of 2 meters/minutes for 10 minutes (method B). The migration of the resin in the product obtained by the method A was considerably prevented, but as long as 50 minutes was needed for drying. On the other hand, in the product obtained by the method B, there was a great migration of the resin in the drying step, and therefore, the resulting sheet had a great nonuniformity in density and a high hardness, and a tended to develop breakings. The same mixed dispersion for coating as used in Example 1 was coated on the substrate, and dried under the same conditions as in Example 1 to form a microporous sheet having a dry basis weight of 255 g/m$^2$ and an apparent density of 0.52 g/cm$^3$.

From Table 1 below, it is apparent that the porous sheet materials obtained in accordance with this invention had superior suppleness and processability and very good durability and surface characteristics.

Table 1

|  | R' (the molar ratio of chain extender to polymer diol) | Organic solvent-soluble part/insoluble part | Coagulating agent | Coagulation value of the coagulant (g) |
| --- | --- | --- | --- | --- |
| Example 1 | 2.5 | 65/35 | Methanol | 15 |
| Example 2 | 2.5 | 65/35 | Methanol | 15 |
| Example 3 | 3.5 | 28/72 | Methanol | 8 |
| Example 4 | 3.5 | 70/30 | Isopropyl alcohol | 22 |
| Example 5 | 2.0 | 80/20 | n-Hexane | 19 |
| Comparative Example 1 | 2.5 | 100/0 | Methanol | — |
| Comparative Example 2 | 2.5 | 65/35 | Methanol | — |
| Comparative Example 3 | 2.5 | 65/35 | n-Amyl alcohol | 28 |
| Comparative Example 4 | 2.5 | 65/35 | — | — |
| Comparative Example 5 (A) (B) | 1.9 | 87/13 | Water | >31 |

Figure 4:
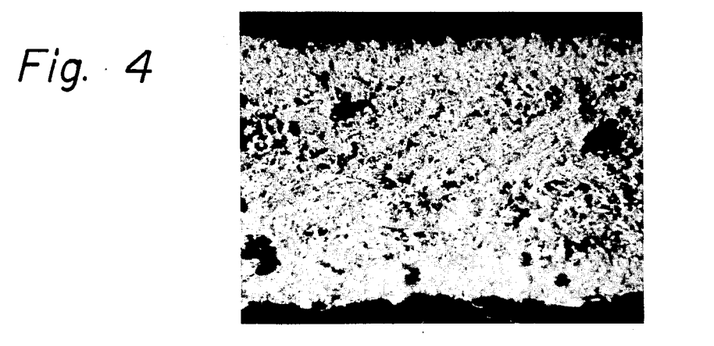

|  | Characteristics of the impregnated substrate | | | | Characteristics of the coated substrate | | | |
| --- | --- | --- | --- | --- | --- | --- | --- | --- |
|  | Flexural rigidity (kg/cm$^2$) | Wrinkle length in lasting | Load at 20% stretch (kg/cm)(longitudinal/transverse) | Migration of the resin | Static surface unevenness | Unevenness at 20% strength | Wrinkle length in lasting | Resistance to bending (JIS-K-6505) |
| Example 1 | 80 | 11.0 | 5.8/3.2 | Slight (FIG. 3) | 4 | 6 | 7 | No abnormality after 600,000 cycles |
| Example 2 | 68 | 10.0 | 5.6/3.2 | Slight (FIG. 4) | 4 | 6 | 7 | No abnormality after 600,000 cycles |
| Example 3 | 70 | 10.5 | 5.6/3.2 | Slight (FIG. 5) | 3 | 5 | 7 | No abnormality after 600,000 cycles |
| Example 4 | 80 | 11.0 | 5.7/3.0 | Slight (FIG. 6) | 3 | 5 | 8 | No abnormality after 600,000 cycles |
| Example 5 | 85 | 11.2 | 6.1/3.7 | Slight (FIG. 7) | 4 | 6 | 8 | No abnormality after 600,000 cycles |
| Comparative Example 1 | 142 | 18.4 | 9.2/3.7 | Very great (FIG. 8) | 8 | 12 | 14 | Hole was formed extending from the non-woven fabric layer to the surface skin layer |

Table 1-continued

Figure 12:
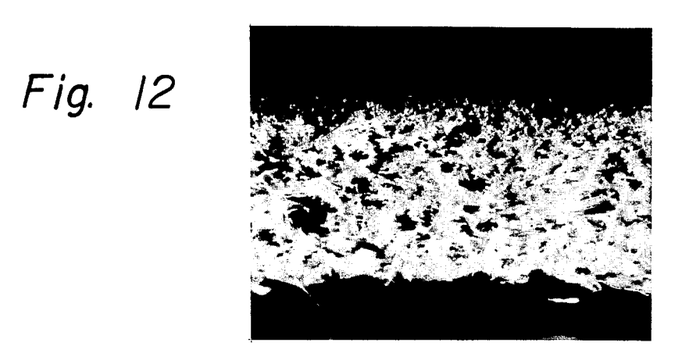
Figure 13:
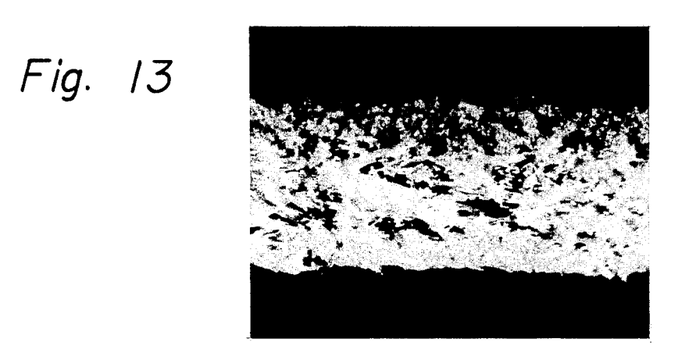

| | | | | | | | | |
|---|---|---|---|---|---|---|---|---|
| Comparative Example 2 | 96 | 13.2 | 7.8/4.6 | Little (FIG. 9) | 6 | 8 | 12 | after 300,000 cycles The surface of the non-woven fabric layer collapsed after 600,000 cycles |
| Comparative Example 3 | 98 | 13.0 | 7.2/4.4 | Medium (FIG. 10) | 6 | 8 | 11 | The surface of the non-woven fabric layer collapsed after 600,000 cycles |
| Comparative Example 4 | 115 | 14.5 | 8.0/4.6 | Great (FIG. 11) | 6 | 8 | 12 | Hole was formed to a depth of about ½ from the back of the non-woven fabric after 600,000 cycles |
| Comparative Example 5 | | | | | | | | |
| (A) | 90 | 12.0 | 6.2/4.0 | Little (FIG. 12) | 5 | 7 | 10 | No abnormality after 600,000 cycles |
| (B) | 96 | 14.0 | 7.0/4.1 | Great (FIG. 13) | 6 | 8 | 10 | Collapsing occurred on the back surface of the non-woven fabric after 600,000 cycles |

What we claim is:

1. In a process for producing microporous sheet materials by the steps of:
   (1) preparing a suspension of a resinous component in an organic solvent having a boiling point of not more than 120° C., the solubility at 25° C. of water in the organic solvent being from 1 to 50 g per 100 g of the solvent, the resinous component being selected from the group consisting of (a) a polyurethane-type elastomer containing polyoxyethylene segments in an amount of 2 to 25% by weight (polymer A) and (b) a mixture of polymer A and a polyurethane-type elastomer not containing polyoxyethylene segments (polymer B), the resinous component consisting of 20 to 85% by weight of a part soluble in the organic solvent and 80 to 15% by weight of a part insoluble in the organic solvent;
   (2) mixing the resulting organic solvent suspension with water in an amount of not less than 50% by weight based on the resinous component in the organic solvent suspension to form a water-in-oil dispersion;
   (3) coating or impregnating a substrate with the resulting dispersion; and
   (4) drying the coated or impregnated substrate; the improvement which comprises prior to step (4) contacting the resulting coated or impregnated substrate of step (3) with a coagulant selected from the group consisting of methanol, ethanol, propanol and isopropanol for a period of time of from 10 to 180 seconds to coagulate a part of the resinous component, and thereafter drying the substrate according to step (4) at a temperature between 40° C. and 120° C. for 10 to 30 minutes to evaporate the organic solvent and water.

2. The process of claim 1 wherein the resulting coated or impregnated substrate is contacted with the coagulant at a temperature of from 20° C. to 50° C.

3. The process of claim 1 wherein the resulting coated or impregnated substrate is contacted with the coagulant for a period of from 30 to 120 seconds.

* * * * *